United States Patent [19]

Yamada et al.

[11] Patent Number: 4,904,285
[45] Date of Patent: Feb. 27, 1990

[54] DEAERATOR FOR PARTICULATES

[75] Inventors: Yasuo Yamada; Mamoru Nakayama; Kazuo Sagara, all of Kitakyushu, Japan

[73] Assignee: Mitsubishi Kasei Corporation, Tokyo, Japan

[21] Appl. No.: 225,760

[22] Filed: Jul. 29, 1988

[30] Foreign Application Priority Data

Jul. 29, 1987 [JP] Japan .................................. 62-187729
May 30, 1988 [JP] Japan .................................. 63-130215

[51] Int. Cl.$^4$ ............................................. B01D 46/00
[52] U.S. Cl. .......................................... 55/191; 55/203; 55/523; 210/188; 210/414; 210/489; 198/661; 100/90; 100/117; 100/145
[58] Field of Search ............... 210/188, 406, 411, 413, 210/414, 415, 484, 489; 55/203, 523, 526, 191, 189; 198/661; 100/145, 90, 117

[56] References Cited

U.S. PATENT DOCUMENTS

| | | | |
|---|---|---|---|
| 1,686,095 | 10/1928 | Manning | 210/406 |
| 2,455,804 | 12/1948 | Ransley et al. | 55/523 |
| 2,745,513 | 5/1956 | Massey | 55/523 |
| 3,087,233 | 4/1963 | Turnbull | 55/523 |
| 3,585,924 | 6/1971 | Nolan | 210/415 |
| 4,114,794 | 9/1978 | Storms | 55/523 |
| 4,126,560 | 11/1978 | Marcus et al. | 55/523 |
| 4,150,617 | 4/1979 | Schramm et al. | 100/117 |
| 4,528,098 | 7/1985 | Treyssac et al. | 210/414 |

FOREIGN PATENT DOCUMENTS

| | | |
|---|---|---|
| 97335 | 11/1963 | Denmark . |
| 3537672 | 5/1987 | Fed. Rep. of Germany . |
| 2341524 | 10/1977 | France . |
| 59-113997 | 6/1984 | Japan . |
| 1178471 | 3/1984 | U.S.S.R. . |
| 2052284 | 1/1981 | United Kingdom . |

*Primary Examiner*—Peter Hruskoci
*Assistant Examiner*—Christopher Upton
*Attorney, Agent, or Firm*—Oblon, Spivak, McClelland, Maier & Neustadt

[57] ABSTRACT

A deaerator for particulates capable of increasing the bulk density of the particles to reduce the volume of the particulates. In the deaerator, a perforated cylindrical section (1a) of a cylindrical body (1) includes a filter (13) formed of a sintered material. A screw conveyor (4) arranged in the cylindrical body has a screw pitch (4a, 4b) which is small and which gradually reduces the region on the downstream side of the perforated cylindrical section. The filter may be formed by sintering a fine metal fibre, a metal powder or a ceramic powder.

17 Claims, 5 Drawing Sheets

DEAERATOR FOR PARTICULATES

BACKGROUND OF THE INVENTION

1. Field of the Invention

The present invention relates to a deaerator for particulates or particulate materials, and more particularly to a deaerator which is adapted to increase bulk density of particles and reduce the volume of the particulates, to facilitate handling operations such as bagging, transportation etc.

2. Description of the Prior Art

Figure 9:
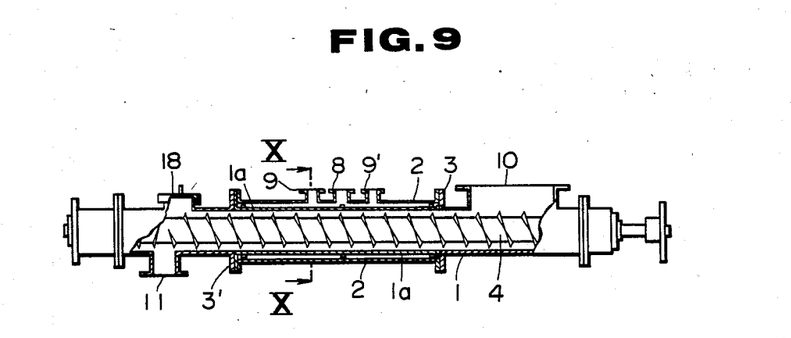
FIG. 9 is a view similar to FIG. 1 showing a conventional deaerator.
Figure 10:
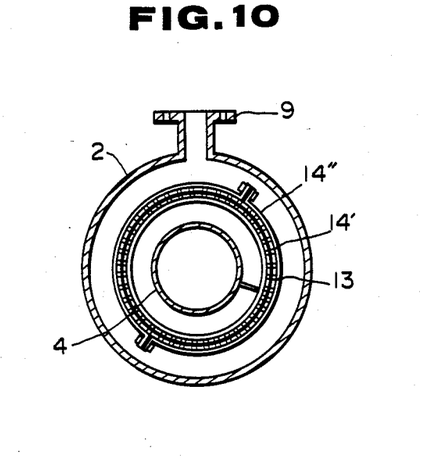
FIG. 10 is a sectional view taken along line X—X of FIG. 9.
Figure 11:
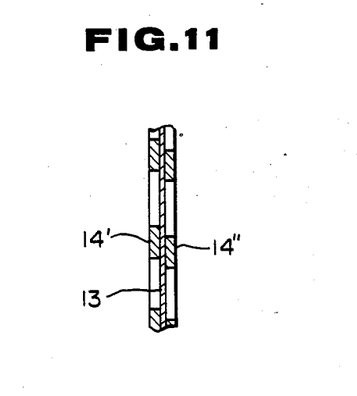
FIG. 11 is a sectional view showing an example of part of a perforated cylindrical section used in the conventional deaerator of FIG. 9.

A conventional deaerator of such a type is generally constructed as shown in FIGS. 9 to 11. The deaerator includes a cylindrical body 1 with a chargeport or inlet 10 in its upper portion at one end, for charging the particulates and a discharge port or outlet 11 in its lower portion at the other end for discharging the particulates. In the cylindrical body 1, a screw conveyer 4 having a constant pitch screw along its whole length is rotatably supported. The cylindrical body 1 has a perforated cylindrical section 1a at an intermediate portion, to serve as a filter.

Outside of the cylindrical section 1a, an outer cylinder 2 is located concentrically, spaced at a predetermined distance from the cylindrical section 1a. An evacuation pipe 8 is provided for vacuum suction and compressed-air pipes 9 and 9' are provided for back wash of the filter, so that the space between the cylindrical section 1a and the outer cylinder 2 may serve as an evacuation chamber. A filter comprising perforated metal plates 14' and 14" with a filter fabric 13 sandwiched between them is used as the perforated section 1a.

In this converntional deaerator, when particulates which still have a low bulk density are charged through the charge port 10 into the cylindrical body 1, air in the particulates is evacuated through the evacuation pipe 8 by the suction of a vacuum pump, to increase the build density of the particulates while transporting the particulates through the transfer chamber formed between the cylindrical body 1 and the screw conveyor 4. This is achieved by means of the screw conveyor and the particulates, with increased bulk density, are discharged from the discharge port 11.

The particulates transported in the transfer chamber by the screw conveyor 4 are gradually deaerated while being guided through the perforated cylindrical section 1a. Thus, the bulk density gradually increases and the volume of the particulates decreases. However, this concurrently causes the ratio or degree of filling of the particulates in the transfer chamber to be gradually reduced, leading to voids in the transfer chamber and therefore in the cylindrical body 1, resulting in the inflow of air from the discharge port 11 into the transfer chamber. This inflow of air into the transfer chamber decreases the degree of vacuum of the evacuation chamber, and so the efficiency of deaeration of the particles falls leading to a reduction in the increase in bulk density. Thus, the conventional deaerator fails to increase bulk density of particulates substantially. In general, the increase in the bulk density is limited to about 1.3 to 2 times the initial bulk density, although this varies depending upon the type of particulates, the initial bulk density and the like.

Also, the conventional deaerator is generally operated while setting the negative pressure of the vacuum pump within a range between $-600$ mmHg and $-700$ mmHg. This tends to cause the filter fabric 13 sandwiched between the perforated metal plates 14' and 14" to stretched or break so that particulates being transferred leak out through the damaged filter fabric to the vacuum pump causing failure of the vacuum pump and the like.

In order to avoid these difficulties, it has been proposed to reduce the porosity of the perforated metal plates 14' and 14" to protect the filter fabric 13 and to compensate for deficiencies in the strength of the filter fabric 13. However, for example, a decrease in the porosity of the perforated metal plates 14' and 14" to about 40% merely leads to a prolongation of the life of the filter by at most about one week. Any further decrease in the porosity causes a decrease in a filtering area of the filter which substantially deteriorates the performance of the deaerator.

The conventional deaerator has another disadvantage in that it is very difficult and troublesome to assemble the filter while accurately aligning the holes of the two perforated metal plates 14' and 14" with one another and so replacement of the filter fabric 13 requires much time and labor.

In the conventional deaerator, deaeration is carried out in such a manner that a cake layer of particulates is formed in the clearance of several millimeters between a screw flight and the filter and the air in the particulates being transferred is removed through the cake layer. Accordingly, when particulates which form such a cake layer of large filtering resistance are treated, it is necessary periodically to carry out removal of the cake layer by backwashing the filter. For this, compressed air of 2–3 kg/cm$^2$ is generally used and it is often necessary to carry out the backwash operation several times per hour. The filter fabric used for the filter in the conventional deaerator can be damaged substantially by the backwash and this leads to leakage of the particulates through to the vacuum pump. Thus, frequent replacement of the filter fabric is required.

Also, the backwash often causes the fibres constituting the filter fabric to fall off, resulting in the deaerator being unsuitable for use in fields such as food production, medicine production etc. in which it is essential to prevent the inclusion of foreign matter completely.

SUMMARY OF THE INVENTION

The present invention has been made in view of the foregoing disadvantage of the prior art.

Accordingly, it is an object of the present invention to provide a deaerator for particulates which is capable of improving the efficiency of deaeration and to increase bulk density of the particulates effectively and efficiently by significantly increasing the degree of filling of the particulates on the downstream side of the screw conveyor in the transfer chamber.

Further objects of the invention are: to provide a deaerator for particulates which is capable of effectively preventing leakage of the particulates to the vacuum pump from the deaerating section of the deaerator; to improve the filtration efficiency at a perforated cylindrical section of the deaerator, facilitating backwash of a filter; and to extending the life of the filter, thereby to accomplish deaeration with high efficiency for a long period of time.

According to one aspect of the present invention, there is provided a deaerator for particulate materials comprising a cylindrical body having a charge port at one end and a discharge port at the other end, and a screw conveyor rotatably mounted within the body and arranged to transport particulates from the charge port to the discharge port on rotation, the body having a portion intermediate its ends which is perforated and which includes a filter, the intermediate portion being surrounded by an outer cylinder to define an evacuation chamber therebetween, the evacuation chamber having an evacuation opening and a compressed-air opening, the screw conveyor being so arranged that the space afforded by the screw thread of the conveyor is reduced at least in the downstream region beyond the end of the intermediate portion of the body.

Preferably, the filter is formed of a sintered material, which may comprise fine metal fibres, metal powder or ceramic powder.

According to another aspect of the invention, there is provided a deaerator for particulate materials comprising a cylindrical body having a charge port at one end and a discharge port at the other end, and a screw conveyor rotatably mounted within the body and arranged to transport particulates from the charge port to the discharge port on rotation, the body having a portion intermediate its ends which is perforated and which includes a filter, the intermediate portion being surrounded by an outer cylinder to define an evacuation chamber therebetween, the evacuation chamber having an evacuation opening and a compressed-air opening, the filter being formed from sintered metal fibres, sintered metal powder or sintered ceramic powder.

In such a case, preferably the screw conveyor is so arranged that the space afforded by the screw thread of the conveyor is reduced at least in a downstream region beyond the end of the intermediate portion of the body. The space afforded by the screw thread may be reduced by the screw thread being reduced or by the diameter of the shaft of the screw conveyor being increased.

In one preferred embodiment of the present invention, the deaerator includes a cylindrical body formed on one end side thereof with a charge port for charging particulates therethrough into the cylindrical body and on the other end side thereof with a discharge port for discharging particulates therethrough from the cylindrical body. In this cylindrical body, a screw conveyor is rotatably arranged for transferring particulates in a manner to be positioned at a substantially central portion of the cylindrical body. The cylindrical body is provided at an intermediate portion thereof with a perforated cylindrical section including a filter formed of a sintered material, and is provided on its outside with an outer cylinder to define an evacuation chamber therebetween. This outer cylinder is provided with at least one evacuation pipe for vacuum suction and at least one compressed-air pipe for backwash of the filter. In this embodiment, the screw conveyor has a screw pitch which is small and is gradually reduced in at least the downstream region positioned on the downstream side from the end of the perforated cylindrical section on the discharge port side, as compared with that in the upstream region positioned on the upstream side from the downstream region.

In the present invention, it is preferable that the screw pitch of the screw conveyor in the downstream region is gradually reduced in a range between 50% to 80% of the screw pitch of the screw conveyor in the upstream region. Reduction of the screw pitch of the screw conveyor may be carried out over the whole length of the screw conveyor in such a manner that the screw pitch is gradually reduced from the upstream side of the deaerator to its downstream side. However, such a construction may lead to a decrease in the amount of transfer of particulates and an increase in manufacturing costs of the screw. Accordingly, when the outer diameter of the screw is constant, a construction in which the screw pitch in the downstream region on the downstream side of the end of the perforated cylindrical section, on the discharge port side is small and gradually decreases as compared with that upstream region positioned on the upstream side from the downstream region, results in an increase in the amount of transfer of particulates and a decrease in manufacturing costs.

In the present invention, the cylindrical body may be provided with a shield plate at an upper portion thereof on the upstream side of the discharge port. Such a construction may prevent the inflow of air through the discharge port into the cylindrical body more effectively.

The present invention may be so constructed that the evacuation chamber is divided into a plurality of chamber sections, with an evacuation pipe and a compressed-air pipe provided in communication with each of the chamber sections. Such a construction permits deaeration of particulates by suction and backwash of the perforated cylindrical section to be carred out for each chamber section, so that the deaerator may be continuously operated with a high efficiency without interrupting the transfer of particulates.

In a preferred embodiment of the present invention, the screw conveyor includes a basic screw pitch section and a screw pitch reduced section in which the screw pitch is gradually decreased from a position near the downstream side end plate to the downstream section of the screw conveyor. Such a construction of the screw conveyor permits the degree of filling of the particulates transferred to be gradually increased. Alternatively, the screw conveyor may be constructed in such a manner that the diameter of its shaft gradually increases from the position near the downstream side end plate to the downstream section of the screw conveyor.

In another preferred embodiment of the invention, the deaerator includes a cylindrical body formed on one end side thereof with a charge port for charging particulates therethrough into the cylindrical body and on the other end side thereof with a discharge port for discharging particulates therethrough from the cylindrical body and a screw conveyor for transferring particulates which is rotatably arranged in the cylindrical body in a manner as to be positioned at a substantially central portion of the cylindrical body. This cylindrical body is provided at an intermediate portion thereof with a perforated cylindrical section including a filter formed of a sintered material, and is provided on its outside with an outer cylinder to define an evacuation chamber therebetween. This outer cylinder is provided with at least one evacuation pipe for vacuum suction and at least one compressed-air pipe for backwash of the filter. In this embodiment, the filter of the perforated cylindrical section is formed by sintering a material selected form the group consisting of fine metal fibres, metal powders and ceramic powders.

The filter preferably has a porosity within a range between 65% and 82%.

The filter is preferably formed by sintering fine metal fibres having a diameter of 15 um or less and preferably 1-10 um. The metal fibres may be formed into a shape such as a web-like shape, a mesh-like shape or a fabric-like shape by sintering.

The filter may be formed into a single-layer or a multilayer shape e.g. comprising a fine layer and a coarse layer. Such a construction of the filter causes the filter to exhibit excellent resistance to breakage while still carrying out fine filtering.

Metal for the fine metal fibres of which the filter is formed may be selected from the group consisting of stainless steel, nickel, and alloys thereof.

The filter may be formed integrally with metal meshes arranged on both surfaces of the filter so as to sandwich the filter between them, resulting in a laminated structure. Alternatively, the filter may be formed by sintering together with metal meshes arranged on both surfaces of the filter so as to sandwich the filter between them to provide a laminated structure. It is preferable that a perforated metal plate is closely arranged on the inner side of the filter and that the whole filter is formed into a cylindrical shape. Each of the metal meshes may be formed into a plain weave structure of 20 to 40 meshes.

The perforated metal plate on the filter may be a punched metal plate which may have a porosity within the range of 60% to 70%. The metal meshes arranged on the two surfaces of the filter and the perforated metal plate closely arranged on the inner side of the filter each serve as both a protector and a shape retainer for the filter.

In the present invention, when particulates which are still of a low bulk density are charged through the charge portion to the cylindrical body, the screw conveyor transfers the particulates towards the discharge port in the transfer chamber defined between the cylindrical body and screw conveyor, during which the particulates are subjected to suction through the evacuation pipe and the evacuation chamber formed between the perforated cylindrical section and the other cylinder, so that the air in the particulates may be removed. At this time, the compressed-air pipe is kept closed and the filter formed of a sintered material is arranged at the perforated cylindrical section with the result that leakage of part of the particulates through the filter to the evacuation chamber is effectively prevented.

The degree of filling of the particulates in the cylindrical body is decreased with the progress of the deaeration as they pass through the perforated cylindrical section. However, the screw pitch of the screw conveyor is perferably small and gradually decreases in at least the downstream region between the downstream end of the perforated cylindrical section and the discharge port, as compared to the upstream region on the upstream side from the downstream region. Accordingly, the quantity of the particulates transported decreases in the downstream region, so that the degree of filling of the particulates gradually increases. This causes the particulates to be in a properly filled state in the downstream region, resulting in the interior of the cylindrical body being substantially sealed by the particulates. Thus, any inflow of air through the discharge port to the cylindrical body is effectively prevented, and deaeration may be efficiently attained in the region of the perforated cylindrical section or the deaeration region. The particulates thus increased in bulk density are discharged through the discharge port.

Deaeration of particulates in the region of the perforated cylindrical section is carried out through the filter formed of sintered fine metal fibres, metal powders, ceramic powders or the like, thereby effectively preventing leakage of any particulates through the filter and evacuation chamber to the evacuation pipe. Backwash of the filter may be accomplished using compressed air supplied through the compressed-air pipe as in a convention deaerator. The present invention may fully prevent extension or stretching and breakage of the filter during the beckwash operation because it is formed of a sintered material.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numeral designate like or corresponding parts throughout; wherein.

DESCRIPTION OF THE PREFERRED EMBODIMENT

The present invention may be carried into practice in various ways, and some embodiments will now be described by way of example with reference to the accompanying drawings.

Figure 1:
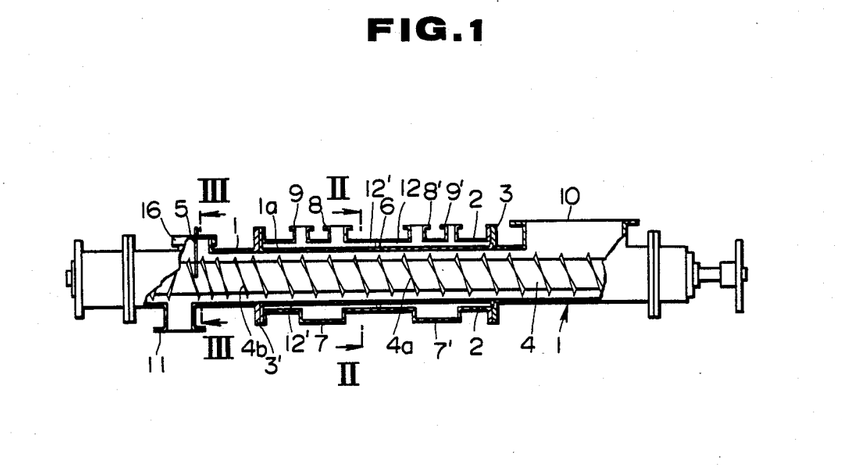
FIG. 1 is a partly cutaway side view of a first embodiment of a deaerator for particulates according to the present invention.
Figure 2:
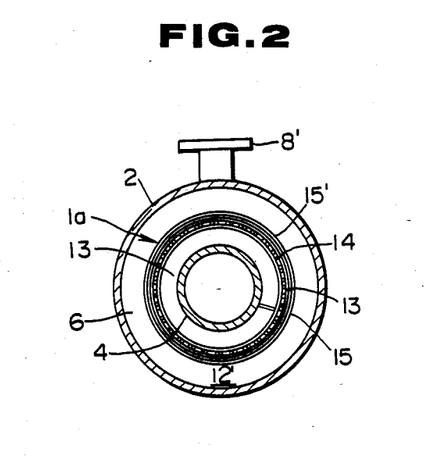
FIG. 2 is a sectional view taken along line II—II of FIG. 1.
Figure 3:
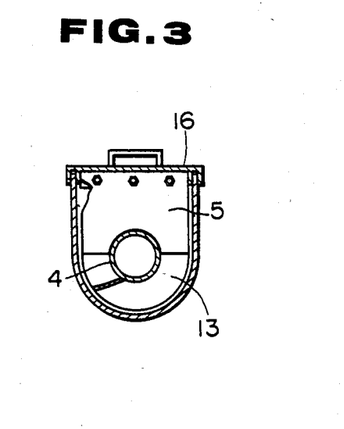
FIG. 3 is a sectional view taken along line III—III of FIG. 1.
Figure 4:
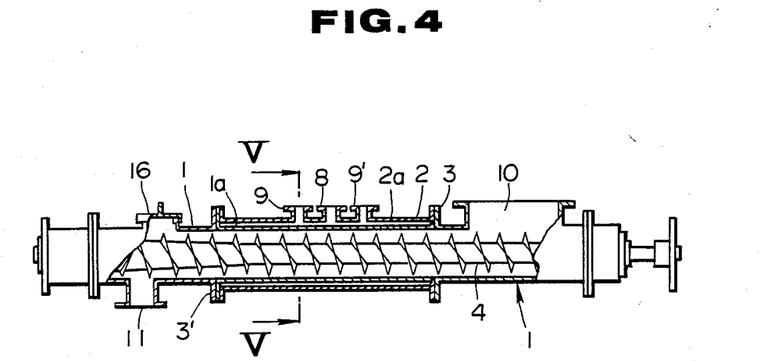
FIG. 4 is a partly cutaway side view of a second embodiment of a deaerator.
Figure 5:
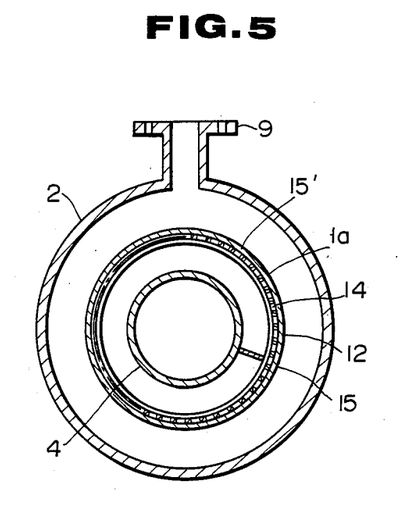
FIG. 5 is a sectional view taken along line V—V of FIG. 4.

The deaerator of each of the first and second embodiments includes a cylindrical body 1 which has a charge port or inlet 10 formed in the upper part of one end, for charging particulates into the cylindrical body 1. At the lower part of the other end, there is a discharge port or outlet 11 for discharging the particulates from the cylindrical body 1. The cylindrical body 1 has a perforated cylindrical intermediate section 1a.

Figure 6:
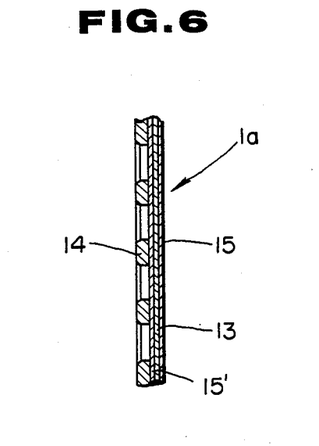
FIG. 6 is a sectional view showing an example of part of a perforated cylindrical section forming part of the deaerator of FIG. 4.

The perforated cylindrical section 1a, as shown in FIG. 6 includes a filter, comprising a filter member 13 formed of a sintered material, prepared for example by sintering metal fibres, metal powders or ceramic powders, wire meshes 15 and 15' between which the filter 13 is sandwiched and a perforated metal plate 14 in close contact with the filter.

Outside the perforated cylindrical section 1a there is an outer cylinder 2, which is closed at both ends by end plates 3 and 3', to define an evacuation chamber. In the first embodiment, the evacuation chamber is partitioned into two chamber sections 12 and 12' by a partition 6 (though it may be divided into three or more chamber sections). The chamber sections 12 and 12' are provided with evacuation pipes 8 and 8' for vacuum suction and compressed-air pipes 9 and 9' for backwash of the filter member 13, respectively. In the second embodiment, the evacuation chamber comprises a single chamber section 12 which is provided with an evacuation pipe 8 and two compressed-air pipes 9 and 9'. Thus, each chamber section to capable of carrying out evacuation and backwash of the filter member 13 independently.

In the first embodiment, when clogging of the filter member 13 occurs, the evacuation pipe 8 or 8' of any one of the chamber sections 12 and 12' is closed and the corresponding compressed-air pipe 9 or 9' is opened instead to introduce compressed air therethrough into the chamber section. This operation is alternately carried out with respect to the chamber sections 12 and 12', so that backwash may be accomplished without interrupting operation of the whole deaerator. Accordingly, when the treatment time and vacuum pressure required are predetermined, continuous operation may be accomplished without deteriorating the increase in bulk density of the particulates.

The deaerator of each of the first and second embodiments also includes a screw conveyor 4 for transporting the particulates in the cylindrical body 1 in a manner to be substantially concentric with the body. In the first embodiment, the screw conveyor 4 includes a basic screw pitch section 4a and a reduced-screw-pitch section 4b where the screw pitch gradually decreases from a position near the downstream side end plate 3 to the downstream section of the screw conveyor 4. Such a construction of the screw conveyor 4 permits the degree of filling of the particulates transferred in the cylindical body 1 to be gradually increased.

In the second embodiment, the screw conveyor 4 is constructed in such a manner that the diameter of its shaft gradually increases from a position near the downstream side of the end plate 3 to the downstream section of the screw conveyor 4. Thus, in the second embodiment, the degree of filling of particulate material with the progress of its transfer gradually increases.

The deaerator of the first embodiment includes a shield plate 5 provided in the upper portion of the cylindrical body 1 on the upstream side of the discharge port 11, which is arranged through an inspection window 16 formed above the discharge port 11 and seves to promote an increase in the bulk density of particulates. This embodiment also includes cleaning holes 7 and 7' at the bottom of the cylindrical body 1 so that the interior of the cylindrical body 1 may be cleaned when the perforated cylindrical section 1a is changed.

In both embodiments, when particulates which are still at a low bulk density are charged through the charge port 10 into the cylindrical body 1, the screw conveyor 4 transfers the particulates toward the discharge port 11 in the transfer chamber defined between the cylindrical body 1 and the screw conveyor 4, during which the particulates are subjected to suction through the evacuation pipes 8 and 8' and the evacuation chamber sections 12 and 12' formed between the perforated cylindrical section 1a and the outer cylinder 2, so that air in the particulates may be removed. During this operation, the compressed-air pipes 9 and 9' are kept closed and the filter member 13 is arranged at the perforated cylindrical section 1a, thus effectively avoiding any leakage of the particulates through the filter member 13 to the evacuation chamber sections 12 and 12'.

The degree of filling of the particulates is decreased in the cylindrical body 1 with the progress of deaeration as they pass through the perforated cylindrical section 1a. As described above, the first embodiment is so constructed that the screw pitch of the screw conveyor 4 is small and gradually decreases in the downstream region between the downstream end of the perforated cylindrical section 1a and the discharge port 11, as compared with the upstream region whereas the second embodiment is so constructed that the shaft of the screw conveyor 4 has a large and gradually increasing diameter in the downward region, as compared to the upstream region. Thus, in each case, the amount of transfer of the particulates decreases in the downstream region, so that the degree of filling of the particulates gradually increases in the downstream region. This results in the particulates being in a properly filled state in the downstream region, and the interior of the cylindrical body being substantially sealed with the particulates. Thus, inflow of air through the discharge port to the cylindrical body is effectively prevented, and deaeration may be effeicienly attained in the deaeration region or the region of the perforated cylindrical section 1a. The particulates thus increase in bulk density are discharged through the discharge port 11.

Deaeration of the particulates in the region of the perforated cylindrical section 1a is carried out through the sintered material filter member 13 theeby preventing leakage of particulates through the filter member 13 to the evacuation chamber sections 12 and 12' and the evacuation pipes 8 and 8'. Backwash of the filter 13 is accomplished using compressed air supplied through the compressed-air pipes 9 and 9' as in the conventional deaerator. The present invention fully prevents stretching and breakage of the filter 13 during the backwash operation because it is formed of a sintered material.

The invention will be illustrated in the following non-limiting examples.

EXAMPLE 1

Figure 7:
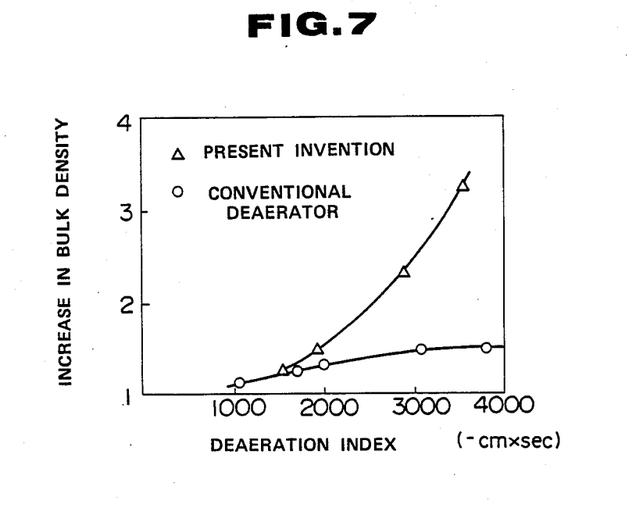
FIGS. 7 and 8 each are graphical representations showing the results of deaeration using a conventional deaerator and a deaerator in accordance with the present invention.

In the example, deaeration of particles was practiced using the deaerator of the first embodiment described above. The results were as shown in FIG. 7, which shows the results obtained using a conventional deaerator for comparison. The results clearly indicate that the present invention permits the degree of filling of the particulates to be significantly increased in the downstream region of the cylindrical body.

More particularly, in the example, particulates having a bulk density of 0.035 g/cm$^3$ when bagged were charged through the charge port 10 into the cylindrical body 1 and the screw conveyor 4 in the cylindrical body 1 was constructed so as to have a screw pitch which gradually decreased from 110 mm to 75 mm on the downstream side of the end plate 3'.

In FIG. 7, the deaeration index represents the product of the vacuum pressure in the evacuation chamber sections 12, 12' and the treatment time, and the treatment time indicates the time required for the charged particulates to pass through the deaeration region or the region of the perforated cylindrical section 1a, which was set by varying the speed of rotation of the screw conveyor 4. In general, the bulk density decrease of particulates depends on the physical properties of the particulates, the vacuum pressure and the treatment time. The results shown in FIG. 7 were obtained by varying both vacuum pressure and treatment time.

As is apparent from the results shown in FIG. 7, in the present invention, an increase in the deaeration index causes an increase in bulk density of the particulates to a level about 3 times or more as high as the initial bulk density whereas in the conventional deaerator, the increase in the bulk density is limited to an increase in the deaeration index to a level as low as about 1.8 times. Also, the results indicate that the deaerator of the first embodiment further increases the bulk density of particulates when the treatment time is further increased.

EXAMPLE 2

In this example, deaeration of particulates was carried out using the deaerator of the second embodiment described above. The results were as shown in FIG. 8, which also shows the results obtained using a conventional deaerator for comparison.

More particularly, in the example, particulates having a bulk density of 0.035 g/cm$^3$ when bagged were charged through the charge port 10 into the cylindrical body 1. A perforated cylindrical section 1a was used in which the filter member 13 had a porosity of 65% and was formed by sintering a web of stainless steel fibres of about 10 μm in diameter. Wire meshes 15 and 15' of about 20 meshes were arranged on the two surfaces of the filter member 13. In the conventional deaerator, a perforated cylindrical section 1a was used which included a filter fabric 13 sandwiched between two perforated metal plates 14 and 14'.

Figure 8:
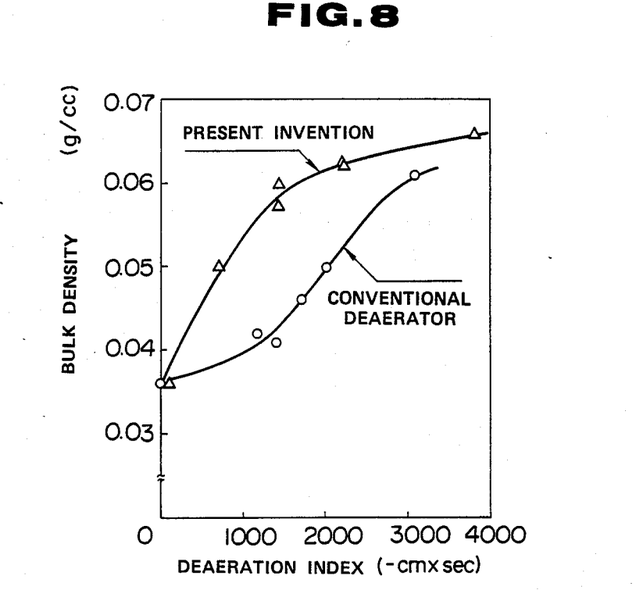

In FIG. 8, the deaeration index represents the product of the vacuum pressure in the evacuation chamber sections 12, 12' and the treatment time, and the treating time indicates the time required for the charged particulates to pass through the region of the perforated cylindrical section 1a, which was set by varying the speed of rotation of the screw conveyor 4. In general, the bulk density decrease of particulates depends on the physical properties of the particulates, the vacuum pressure and the treatment time. The results shown in FIG. 8 were obtained by varying the treatment time while keeping the vacuum pressure at a constant −700 mmHg.

The results of FIG. 8 indicate that, for example, when the deaeration index is 1400 (−cm×sec), the treating time is 20 (sec). When comparing performance of the present invention to that of the conventional deaerator, bulk density of particulates after treatment by the conventional deaerator was 0.041 g/cm$^3$, while the bulk density of the present invention was 0.056 g/cm$^3$.

Also, the results indicate that it would be necessary to double the treatment time using the conventional deaerator in order to provide particulates with the same bulk density as those obtained using the present invention. Thus, it will be noted that the deaerator of the second embodiment significantly increases bulk density of particulates in a short period of time.

In a deaerator of this type, the particulates are transferred by a screw conveyor. Accordingly, it is known that an increase in the rotation rate of the screw conveyor causes the transfer efficiency to be lowered. For example, a test indicated that when the rotation rates were 14 rpm and 30 rpm, the efficiencies were 0.9 and 0.65, respectively, although this did vary somewhat, depending upon the type of particulates.

The following Table 1 shows results of tests to determine the relationship between the throughput rate and the life of the perforated cylindrical section. The texts were carried out on a deaerator according to the second embodiment of the present invention and a conventional deaerator. The throughput rate necessary to five an increase in bulk density of the particulates from 0.036 g/cm$^3$ to 0.06 g/cm$^3$ were determined.

TABLE 1

| ITEMS | DEAERATOR OF EMBODIMENT | CONVENTIONAL DEAERATOR |
|---|---|---|
| Throughput Rate (m$^3$/hr)*$^1$ | 2.6*$^2$ | 1.7 |
| Life | above 18 months | 1 week |

*$^1$The throughput rate means a supply capacity of particulates when the bulk density is increased from 0.036 g/cm$^3$ to 0.06 g/cm$^3$.

*$^2$Calculation formula $Q = 60 \cdot n \frac{\pi}{4} (D^2 - D_o^2) \cdot s \cdot \phi$ Wherein
N is the number of rotations
D is the diameter of the screw flight;
Do is the diameter of the shaft of the screw flight;
S is the pitch of a screw flight; and
φ is the transfer effeciency.

In the case of the deaerator of the second embodiment, $$Q = 60 \times 30 \times \frac{3.14}{4} (0.2^2 - 0.11^2) \times 0.1 \times 0.65 = 2.6 \text{ m}^3/\text{hr}$$

In the case of the convention deaerator, $$Q = 60 \times 14 \times \frac{3.14}{4} (0.2^2 - 0.11^2) \times 0.1 \times 0.9 = 1.7 \text{ m}^3/\text{hr}$$

As can be seen the throughput rate of the conventional deaerator was 1.7 m$^3$/hr, whereas that of the second deaerator was 2.6 m$^3$/hr, thus it will be noted that the throughput of the latter is about 1.5 times greater than that of the former. Also, the deaerator of the second embodiment exhibited a life some seventy times as long as that of the conventional deaerator, thus, eliminating the necessity to replace the filter member formed of the sintered material, so that maintenance is facilitated.

The deaerator of the second embodiment used a sintered body of metal fibres for the perforated cylindrical section which resulted in fine filtering. Also, the use of the sintered body not only prevented leakage of particulates but also accomplished surface filtration of particulates. Thus, it will be noted that it can provide excellent deaerating for a long period of time without any clogging of the filter.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A deaerator for particulate materials comprising:
  a cylindrical body having a charge port at one end, a discharge port at the other end, and a perforated cylindrical section intermediate its ends, said perforated cylindrical section including a filter;
  an outer cylinder surrounding said intermediate section to define an evacuation chamber therebetween, said evacuation chamber having an evacuation opening and a compressed air opening; and a screw conveyor rotatably mounted within said cylindrical body to transport particulates from said charge port to said discharge port upon rotation, said screw conveyor extending from said charge port to said discharge port and having a basic screw pitch section and a gradually decreasing reduced screw pitch section, said basic screw pitch section having a substantially uniform screw pitch and extending from said charge port to a downstream end of said perforated cylindrical section, and said reduced pitch section extending between the downstream end of said perforated cylindrical section and said discharge port.

2. A deaerator as defined in claim 1, wherein the filter comprises a filter of sintered material.

3. A deaerator as defined in claim 2, wherein the sintered material comprises fine metal fibres, metal powder or ceramic powder.

4. A deaerator as defined in claim 1, wherein the screw pitch of the screw conveyor in the downstream region is gradually reduced within a range of 50 to 80% of the pitch in an upstream region.

5. A deaerator as defined in claim 1, wherein the cylindrical body is provided with a shield plate on an upstream side of the discharge port.

6. A deaerator as defined in claim 1, wherein the evacuation chamber is divided into a plurality of chamber sections, said evacuation opening and compressed air opening being provided to each of the chamber sections.

7. A deaerator for particulate materials comprising:
a cylindrical body having a charge port at one end, a discharge port at the other end, and a perforated cylindrical section intermediate its ends, said perforated cylindrical section including a filter;
an outer cylinder surrounding said intermediate section to define an evacuation chamber therebetween, said evacuation chamber having an evacuation opening and a compressed-air opening; and
a screw conveyor extending from said charge port to said discharge port and being rotatably mounted within said cylindrical body to transport particulates from said charge port to said discharge port upon rotation, said screw conveyor having a shaft with a basic substantially uniform diameter section and a section having an increasing diameter said uniform diameter section extending from said charge port to a downstream end of said perforated cylindrical section and said increasing diameter section being located between the downstream end of said perforated cylindrical section and said discharge port.

8. A deaerator as defined in claim 1, wherein the filter has a porosity of between 65 and 82%.

9. A deaerator as defined in claim 7 or 8, wherein the filter is formed by sintering fine metal fibres having a diameter of 15 μm or less.

10. A deaerator as defined in claim 9, wherein the filter is formed into a web-like shape, a mesh-like shape or a fabric like shape.

11. A deaerator as defined in claim 9, wherein the metal is stainless steel, nickel, or an alloy thereof.

12. A deaerator as defined in claim 7, wherein the filter has a plurality of layers.

13. A deaerator as defined in claim 7, wherein the filter comprises a metal mesh arranged on opposite surfaces of the filter in a manner to sandwich the filter therebetween, and form a laminated structure.

14. A deaerator as defined in claim 13 wherein the metal mesh comprises a weave structure of 20 to 40 meshes.

15. A deaerator as defined in claim 7, wherein the filter comprises a laminated structure, on an inner side of which a perforated metal plate is closely arranged.

16. A deaerator as defined in claim 15, wherein the perforated metal plate has a porosity within a range of between 60% and 70%.

17. A deaerator as defined in claim 7 wherein said filter comprises sintered metal fibers, sintered metal powder or a sintered ceramic powder.

* * * * *